Sept. 23, 1952     E. A. RUDOLPH     2,611,470

BREAD FEEDING MACHINE

Filed Aug. 1, 1949

INVENTOR.
EDWARD A. RUDOLPH
BY
Stephens J. Townsend
ATTORNEY

Patented Sept. 23, 1952

2,611,470

UNITED STATES PATENT OFFICE 2,611,470

BREAD FEEDING MACHINE

Edward Albert Rudolph, Richmond Annex, Calif.

Application August 1, 1949, Serial No. 108,027

9 Claims. (Cl. 198—35)

This invention relates to new and useful improvements in bread feeding machines.

This machine is useful in the preparation of sandwiches in large quantities, particularly in depositing slices of bread on a conveyor belt, which moves the slices past various stations, at which operations, such as spreading with mayonnaise or application of sandwich fillers, may be performed. The particular function of the machine is to separate slices of bread from a loaf and deposit them on the moving belt, with the slices positioned in alignment, flat on the belt.

Sliced fresh bread has at least two characteristics which cause difficulty in the rapid preparation of sandwiches. One such characteristic is the fact that the slices tend to adhere to each other, with the result that they must be positively separated and, in the course of such separation, it frequently occurs that two or more slices will adhere, a situation which is undesirable in that the slices must then be separated manually. A second characteristic of freshly sliced bread is that the bread is compressible by reason of its inherent spongy nature; and hence various means of holding the slices of bread, prior to separation, must be devised which take into account this compressibility.

Accordingly, a principal object of the present invention is to separate one by one the slices of a loaf of bread and deposit each slice flat on a conveyor belt.

An additional advantage of the present invention is the fact that the machine is adjustable to compensate for various sizes and thicknesses of slices of bread and their relative freshness.

Additional objects and advantages of the invention are the saving in labor, occasioned by use of the instant machine, and the fact that there is less possibility of contaminating the bread by reason of human contact or proximity.

Further objects of my invention will become apparent upon the reading of the specification and referring to the accompanying drawings in which similar character references represent corresponding parts in each of the several views.

Referring to the drawings.

Figure 1:
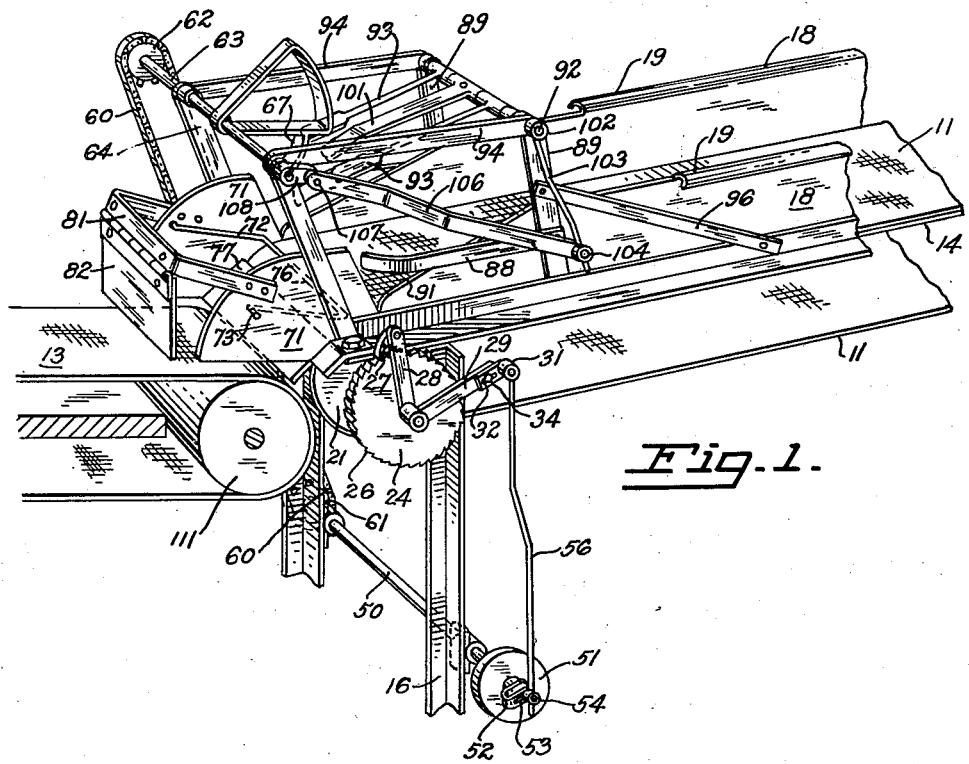
Fig. 1 is a perspective view of the machine.

The invention comprises mechanism associated with two moving belts or surfaces, namely, a first belt 11, upon which sliced loaves 12 of bread may be deposited as received from the bread slicing machine, and a second moving belt 13 in proximity thereto, upon which the slices are deposited one by one. The other mechanism hereinafter described has for its function the separation and transmission of the slices from the first belt 11 to the second belt 13.

The belt 11 in its upper reach moves over an inclined table 14, which is supported by legs 16 adjacent its lower extremity and legs 17 adjacent its opposite extremity. Associated with the table 14 are opposed side pieces 18, the distance between which may be adjusted so as to compensate for varying widths of loaves of bread. Sliced loaves may be inserted between said sides 18 and laterally supported thereby so that as the conveyor belt moves, the bread is moved downwardly. To assist in inserting the bread, the upper edges 19 of sides 18 are curved outwardly.

As illustrated herein, movement of the belt 11 may be intermittent rather than continuous. Adjacent each end of the table 14 are sheaves 21 and 22, supporting and defining the longitudinal limits of the belt 11. The shaft 23, on which the lower sheave is mounted, bears at one end a ratchet wheel 24, having a plurality of fine ratchet teeth 26. A dog 27 is arranged to engage the teeth 26 and rotate the shaft in a counter-clockwise direction, as viewed in Fig. 2. The dog 27 is pivotally attached to rocker arm 28, which is pivotally mounted on the shaft 23 and directly connected to crank arm 29 extending at a fixed angle with respect thereto. The outer end of arm 29 carries pivotal attachment 31; the radial distance of the attachment 31 from the shaft 23 is made adjustable so as to vary the arcuate distance of movement of dog 27, as hereinafter appears. The preferred means for providing for such adjustability is a slot 32 in the arm 29 and a bolt 34 passing through a hole in the attachment 31 and adjustably positioned through the slot 32, as illustrated in Fig. 1.

A drive shaft 50, attached by pulleys and belts (not shown) to a suitable electric motor, bears at one end a revolving disk 51 bearing an adjustable crank 52, the throw of which is made adjustable by reason of a radial slot 53 in the crank which receives pivot 54 so that the eccentricity of pivot 54 may be regulated. A connecting rod 56 connects the attachment 31 with the pivot 54, and by adjusting the throw of the pivot 54 and the position of the attachment 31 the angular movement of the dog 27 for each revolution of the drive shaft 50 may be adjusted accurately. The linear movement of belt 11 may be adjusted to move forwardly the thickness of one slice of bread by adjusting the positions of attachment 31 and pivot 54 to regulate the angular movement of the dog 27.

Also connected to drive shaft 50, by means of chain 60 and sprocket wheels 61 and 62 associated therewith, is shaft 63 journaled in a pair of frame members 64 extending upwardly and outwardly from the table 14. The shaft 63 carries a sector-shaped detaching arm 66, having a width substantially less than the width of a slice of bread. A finger 67, attached to the leading radial member 68 of the detaching arm 66, is of arcuate configuration and raked slightly inwardly.

The distance between the point at which the finger 67 is positioned and the arcuate portion 68 of the detaching arm 66 is about equal to one and one-half times the normal thickness of a slice of bread. The detaching arm 66 continuously revolves in a clockwise direction as viewed in Fig. 2 and as the corner 69 adjacent the outer end of leading radial element 68 engages the top of the outermost slice of the loaf of bread, it moves the upper end of the slice away from the other slices, the upper edge of the slice being bent slightly forwardly in the process. The finger 67 keeps the slice from being impelled horizontally forward and directs the piece downwardly toward the conveyor 13. The arcuate portion 68 of the detaching arm 66 restrains the next slice of bread from following the first slice.

A pair of side plates 71, which in effect constitute extensions of side members 18, extend along the gap between the conveyor belt 11 and the conveyor belt 13 and prevent the bread from falling off the belts. Attached to the opposed plates 71 is a U-shaped wire trip 72, the ends 73 of the legs 74 of which are bent outwardly, as indicated by numeral 73, and extend through holes in the side plates 71 so as to permit the central portion 76 of the trip to rest upon the belt 11.

The function of the central portion 76 of the trip 72 is to engage and retard the lower edge of the slice of bread and thus cause the slice to fall horizontally upon the upper reach of belt 13. A plate 77, having beveled edges 78, is disposed transversely and substantially closes off the space between the belts 11 and 13 and prevents bread from falling between the belts or being carried around by the belt 11. Attached to plates 71 is a U-shaped support 81, from which depends a gate 82 hingedly connected thereto. The function of the gate 82 is to prevent slices of bread from flying outwardly and off the belt 13. The gate 82 further dampens the movement of the slices.

Either connection to the machine herein described or positioned at the next machine is a second gate 86, fixed above the surface of the belt 13 a distance slightly greater than the thickness of a slice of bread, the distance being adjustable for various thicknesses of slices. This gate 86 prevents one slice of bread from either entirely or partially riding on another piece and, functionally, is closely connected with the other parts of the instant machine.

In order to hold back the loaf of bread and prevent more than one slice being fed at a time, the machine is provided with a plurality of resilient fingers which engage the slices. Thus on each side of the machine is a curved, resilient finger 88 attached at its upper end to a frame member 89 inclined slightly forwardly from the vertical and curved inwardly at its lower end to engage the bread. Side members 18 are cut away, as indicated by reference numeral 91, at their lower extremities to permit the inwardly curved portions of the fingers 88 to engage the bread. On the transverse shaft 92, extending between the upper ends of frame members 89, is a pair of depending fingers 93 which rest upon the upper edge of the loaf of bread and restrain movement thereof. Longitudinal members 94 connect the upper extremities of the structural members 64 and 89 and the member 89 is also braced by a strut 96 attached at its opposite end to the table 14.

Fingers 93 are loose on the shaft 92 but the finger or separator 101, interposed therebetween, is pinned to the shaft. A collar 102 is fixed to one end of the shaft 92 and connected by rod 103 to a pivotal connection 104 on lever 106, the opposite end of which engages a crank pin 107 attached to crank arm 108 fixed to shaft 63. The relationship is such that rotation of shaft 63 causes the finger 101 to be moved downwardly at the time that the detaching arm 66 is removing the last slice from the loaf of bread. The position of the outer extremity of finger 101 is such that it holds back the next slice of bread and prevents it from moving away with the previous slice which is being disengaged. Further rotation of the shaft 63 causes the finger 101 to move upwardly, and at this time the belt 11 is moving forward and carrying the next slice into position.

Figure 2:
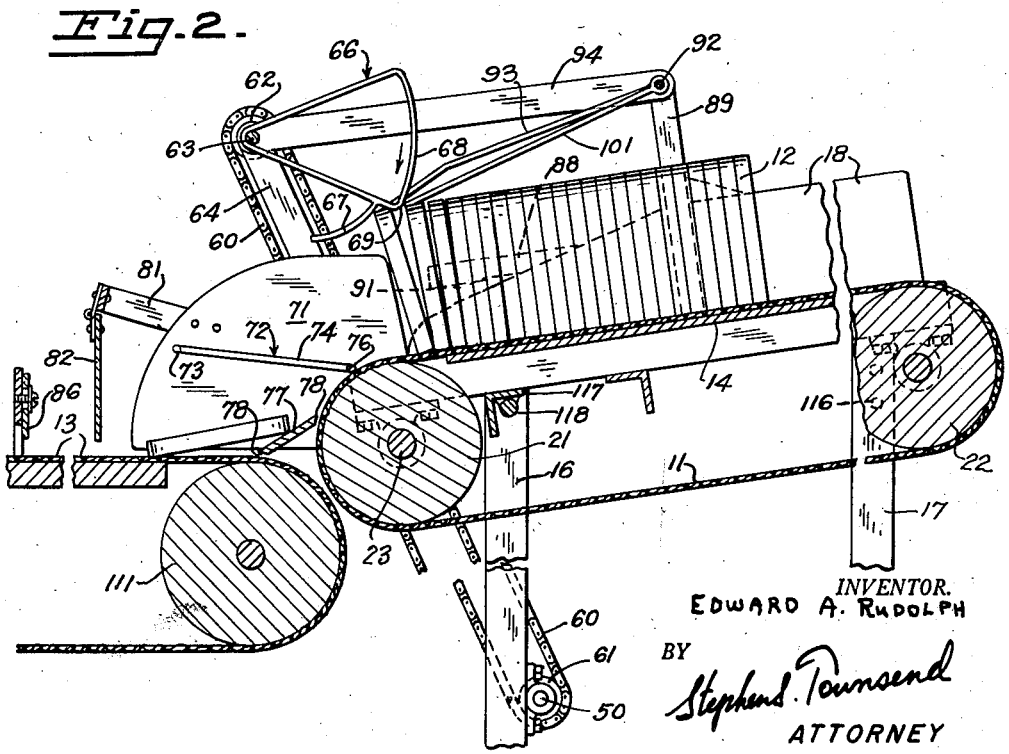
Fig. 2 is a vertical section, taken substantially through the mid-section of the machine.

It will be observed, therefore, that the relationship of the disengaging arm 66, crank 108 and crank 52 on their respective shafts is such that the belt 11 is not moving and the finger 101 is depressed when the disengaging arm 66 is removing a slice of bread—i. e., when the parts are in the position shown in Fig. 2. After the disengaging arm 66 has moved past the position shown in Fig. 2, the finger 101 is elevated and the ratchet 24 moves the belt 11 forwardly.

The inclination of table 14 may be made adjustable by selection of suitable holes 116 in legs and transverse angle 117, the lower end of table 14 resting on studs 118 on legs 16.

Operation

To summarize and correlate the operational features of the machine hereinbefore described: The attendant places one or more loaves 12 of sliced bread on the conveyor belt 11 between the side pieces 18. The electric motor (not shown) causes rotation of the shaft 50 which, by reason of the eccentric throw of crank 52, causes an intermittent forward movement of the dog 27 which engages the teeth 26 of the ratchet wheel 24, there being suitable adjustment to regulate the angularity of rotation of the ratchet wheel 24 in accordance with the thickness of the slices of bread. As the ratchet wheel 24 moves, it causes the belt 11 to move forwardly and carry the bread a distance equal to the thickness of one slice, the forward movement of the bread being occasioned by the frictional engagement of the belt 11 with the underside of the bread, together with the attraction of gravity by reason of the inclination of the top reach of the belt 11 and the weight of the bread piled upon the belt behind the lowermost slice.

At the time the belt 11 is moving forwardly, the finger 101 is elevated, but after forward movement has stopped and at the time when the disengaging arm 66 is moving around until it contacts the lowermost slice of bread, the finger 101 is depressed so that its outer extremity is interposed between the outermost and the next outermost slice of bread, the actuation of this finger being occasioned by oscillation of the shaft 92, which is connected by rod 103, lever 106 and crank 108 to the shaft 63 on which the disengaging arm 66 is mounted. The end 69 of the leading radial edge 68 of the disengaging arm 66 contacts and moves forwardly the upper side of the outermost slice of bread and pulls or bends it out of engagement with the fingers 88 and 93 which hold back the various slices at such time as they are being moved by the disengaging arm 66. The finger 67, attached to the leading radial edge 68 of the disengaging arm 66, prevents the slice from flying out of the machine in case there is any such tendency. The central portion 76 of the trip 72 engages the bottom edges of the slice and causes it to fall flat on the belt 13. The plate 77 prevents the bread from being carried around on the belt 11 or falling between the sheaves 21 and 111, which supports belt 13. A hinged gate 82 dampens the movement of the bread and prevents the various slices from being thrown off of the belt.

The side pieces 18 provide lateral support for the loaf. The belt 13 carries the slices away for subsequent operations, it being understood that the linear speed of movement of the belt 13 is considerably greater than that of the belt 11, since the width of the bread is considerably greater than the thickness of the slices.

A second gate 86, positioned a distance above the top surface of the belt 13 slightly greater than the thickness of the slice, prevents a second slice from being carried along on top of another slice. This second gate 86 may be positioned at any convenient point either in proximity to the structure hereinabove described or at the next station.

Although I have described my invention in some detail by way of illustration for purposes of clarity of understanding, it is understood that certain changes and modifications may be made therein without departing from the spirit of the invention or scope of the appended claims.

I claim:

1. In a machine for feeding slices of bread from a sliced loaf of bread, a conveyor, means for intermittently advancing said conveyor a distance substantially equal to the thickness of a slice of bread, means for holding the slices of bread and restraining random forward movement of said slices, and a disengaging arm adapted to first strike and then move forwardly the furthermost slice and disengage said slice from said last mentioned means, said disengaging arm being arranged to contact said furthermost slice when said first mentioned means is not advancing the loaf.

2. In a bread feeding machine, a first conveyor, means for intermittently advancing said first conveyor a distance substantially equal to the thickness of a slice of bread, means proximate said conveyor for receiving and laterally supporting slices of bread, a plurality of resilient fingers engaging and restraining forward movement of the furthermost slice of bread, a disengaging arm arranged to first strike and then move forwardly said furthermost slice and disengage said slice from said fingers, a second conveyor, and guide means directing said slice from said first conveyor to said second conveyor.

3. A machine as defined in claim 2, in which said disengaging arm is arranged to revolve in timed relationship to said first mentioned means and comprises a pair of diverging radial arms and an arcuate surface joining the extremities of said arms arranged so that the corner at which the leading and said arcuate surface intersect contacts adjacent to the upper edge of a slice of bread.

4. In a bread feeding machine, a first conveyor, means proximate said conveyor for receiving and laterally supporting slices of bread, a plurality of resilient fingers engaging and restraining forward movement of the furthermost slice of bread, a disengaging arm arranged to first strike and then move forwardly said furthermost slice and disengage said slice from said fingers, a second conveyor, guide means directing said slice from said first conveyor to said second conveyor, said guide means comprising a pair of opposed side plates extending on either side of said machine from the region of said first conveyor to said second conveyor, and a trip arranged to engage the lower edge of said slice of bread to position said slice substantially parallel with said second conveyor.

5. In a bread feeding machine, a first conveyor, means proximate said conveyor for receiving and laterally supporting slices of bread, a plurality of resilient fingers engaging and restraining forward movement of the furthermost slice of bread, a disengaging arm arranged to first strike and then move forwardly said furthermost slice and disengage said slice from said fingers, a second conveyor, guide means directing said slice from said first conveyor to said second conveyor, said guide means comprising a pair of opposed side plates extending on either side of said machine from the region of said first conveyor to said second conveyor, a trip arranged to engage the lower edge of said slice of bread to position said slice substantially parallel with said second conveyor, and a gate arranged to swing about a pivot transverse to said second conveyor and disposed with its lower edge positioned above said second conveyor a distance about equal to the thickness of a slice of bread.

6. In a bread feeding machine, a conveyor, means for intermittently advancing said conveyor a distance substantially equal to the thickness of a slice of bread, means proximate said conveyor for receiving and laterally supporting slices of bread, a plurality of resilient fingers engaging and restraining forward movement of the furthermost slice of bread, a disengaging arm arranged to contact and move forwardly said furthermost slice and disengage said slice from said fingers, and a separator arranged to be interposed between said furthermost slice and the next adjacent slice to create a gap between the top edges thereof and to cooperate with said disengaging arm for disengagement of a single slice of bread at a time and arranged to be elevated out of engagement with said slice during movement of said conveyor.

7. A machine as defined in claim 6, in which means for moving said conveyor, means for actuating said disengaging arm and means for elevating said separator are all arranged for actuation in timed relationship to each other.

8. A machine as defined in claim 6, in which said disengaging arm and said separator are connected together by means arranged to depress said separator when said disengaging arm contacts the bread, said means comprising separate shafts on which said arm and separator are mounted, cranks on each of said shafts, and a connecting lever between said cranks.

9. In a bread feeding machine, a first conveyor, means proximate said conveyor for receiving and laterally supporting slices of bread, a plurality of resilient fingers engaging and restraining forward movement of the furthermost slice of bread, a disengaging arm arranged to first strike and then move forwardly said furthermost slice and disengage said slice from said fingers, a second conveyor, guide means directing said slice from said first conveyor to said second conveyor, and a gate arranged to swing around a pivot transverse to said second conveyor and disposed with its lower edge positioned above said second conveyor a distance about equal to the thickness of a slice of bread.

EDWARD ALBERT RUDOLPH.

REFERENCES CITED

The following references are of record in the file of this patent:

UNITED STATES PATENTS

| Number | Name | Date |
|---|---|---|
| 804,170 | Prince | Nov. 7, 1905 |
| 1,368,780 | Anderson | Feb. 15, 1921 |
| 1,920,563 | Jahne | Aug. 1, 1933 |
| 1,993,240 | Ciolino | Mar. 5, 1935 |
| 2,344,461 | Hermani | Mar. 14, 1944 |

FOREIGN PATENTS

| Number | Country | Date |
|---|---|---|
| 804,170 | Germany | Nov. 7, 1905 |
| 528,039 | Germany | June 26, 1931 |